United States Patent
Anttila

(10) Patent No.: US 7,395,084 B2
(45) Date of Patent: Jul. 1, 2008

(54) DYNAMIC ANTENNA ALLOCATION SYSTEM

(75) Inventor: Donald S. Anttila, Southbury, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 493 days.

(21) Appl. No.: 11/041,448

(22) Filed: Jan. 24, 2005

(65) Prior Publication Data

US 2006/0166628 A1    Jul. 27, 2006

(51) Int. Cl.
- H04M 1/00 (2006.01)
- H04Q 7/20 (2006.01)
- H04B 17/00 (2006.01)
- G01S 5/04 (2006.01)

(52) U.S. Cl. ............... 455/552.1; 455/431; 455/296; 455/226.3; 455/275; 455/280; 342/417; 342/444

(58) Field of Classification Search ........... 455/561, 455/562.1, 431, 63.1–65, 552.1, 136, 140, 455/275, 276.1–278.1, 553.1, 303; 342/417, 342/444

See application file for complete search history.

(56) References Cited

U.S. PATENT DOCUMENTS

| | | | |
|---|---|---|---|
| 4,074,270 A | 2/1978 | Kaloi | |
| 4,134,118 A | 1/1979 | Corbett | |
| 4,392,139 A * | 7/1983 | Aoyama et al. | 343/705 |
| 4,905,012 A | 2/1990 | Foti | |
| 5,347,286 A | 9/1994 | Babitch | |
| 5,355,522 A * | 10/1994 | Demange | 455/62 |
| 5,621,421 A | 4/1997 | Kolz et al. | |
| 5,825,332 A | 10/1998 | Camacho et al. | |
| 5,903,826 A * | 5/1999 | Nowak | 455/277.1 |
| 5,970,395 A | 10/1999 | Weiler et al. | |
| 6,052,605 A * | 4/2000 | Meredith et al. | 455/561 |
| 6,094,165 A * | 7/2000 | Smith | 342/373 |
| 6,108,539 A * | 8/2000 | Ray et al. | 455/430 |
| 6,154,637 A * | 11/2000 | Wright et al. | 455/66.1 |
| 6,308,052 B1 | 10/2001 | Jamali et al. | |
| 6,487,414 B1 * | 11/2002 | Tanay et al. | 455/450 |
| 6,640,104 B1 * | 10/2003 | Borst et al. | 455/450 |
| 6,671,516 B1 * | 12/2003 | Doi | 455/509 |
| 6,718,184 B1 * | 4/2004 | Aiken et al. | 455/562.1 |
| 6,788,268 B2 * | 9/2004 | Chiang et al. | 343/850 |
| 6,879,845 B2 * | 4/2005 | Suzuki et al. | 455/562.1 |
| 6,920,192 B1 * | 7/2005 | Laroia et al. | 375/347 |
| 6,950,416 B1 * | 9/2005 | Feuerstein et al. | 370/335 |
| 6,992,622 B1 * | 1/2006 | Chiang et al. | 342/374 |
| 7,072,634 B2 * | 7/2006 | Tillotson | 455/296 |
| 7,079,809 B1 * | 7/2006 | Scherzer | 455/39 |
| 2003/0228857 A1 * | 12/2003 | Maeki | 455/278.1 |
| 2004/0219899 A1 * | 11/2004 | Ho et al. | 455/273 |
| 2006/0079275 A1 * | 4/2006 | Ella et al. | 455/553.1 |

* cited by examiner

*Primary Examiner*—Duc M Nguyen
(74) *Attorney, Agent, or Firm*—Carlson, Gaskey & Olds

(57) ABSTRACT

A communication system with an antenna array having a respective antenna for each of a multitude of communication modules and a control system which seiectiyely reassigns communication over a first of said multitude of communication modules to a second communication module of said multitude of communication modules in response to identification of a predicted interference within a predetermined interference matrix.

32 Claims, 3 Drawing Sheets

| | $R_1+A_1$ | $R_2+A_2$ | $R_3+A_3$ | $R_4+A_4$ | $R_5+A_5$ | $R_N+A_N$ |
|---|---|---|---|---|---|---|
| $R_1 + A_1$ | ✕ | OK | OK | OK | OK | |
| $R_2 + A_2$ | FREQ R- GOTO R4 | ✕ | OK | OK | OK | |
| $R_3 + A_3$ | OK | OK | ✕ | OK | FREQ | |
| $R_4 + A_4$ | OK | FREQ X,Y,Z | FREQ X,Y,Z GOTO | ✕ | OK | |
| $R_5 + A_5$ | OK | OK | OK | OK | ✕ | |
| $R_N + A_N$ | | | | | | ✕ |

INTERFERENCE MATRIX

FIG. 3

DYNAMIC ANTENNA ALLOCATION SYSTEM

BACKGROUND OF THE INVENTION

The present invention relates to a communication system, and more particularly to management of an antenna array.

Aircraft communications systems usually include a receiver-transmitter, a digital interface of the control panel mechanism to and from the receiver transmitter, and an antenna system. The antenna system of a typical communications system is connected to the receiver-transmitter by a coaxial cable, sometimes known as a transmission line. This basic arrangement can be found in aircraft and in ground installations.

Some conventional communications systems connect the receiver-transmitter and the antenna as a dedicated, matched pair, and the antenna is tuned to operate efficiently over the particular receiver-transmitter's operating range. In more complex applications, a receiver-transmitter may be connected to a second antenna by a control mechanism and a coaxial relay. A typical application may be an upper antenna and a lower antenna, each mounted on an aircraft. This type of dual antenna design allows the crew to direct the radio to the preferred antenna so as to increase coverage for the upper hemisphere or the lower hemisphere (or fore/aft, etc.) according to the operational requirements at that time. Such antenna switching is performed by switching the antenna control lines and the RF coaxial lines via a combination of coax switches and conventional control line switching usually performed by relays. The result is an effective communications system that provides a desired spatial coverage, but may frequently results in some interferences due to the practical limitations of space available to locate antennas.

As receiver-transmitters have become capable of covering a wider spectrum of frequencies, the design of the antenna hardware has become more complex and more expensive. Active impedance tuning elements in the antenna are digitally switched in or out of the antenna's internal impedance matching mechanisms to adjust the effective impedance of the antenna for optimum/efficient transmission.

Furthermore, as the capabilities of radios continue to increase, or as the number of radios installed on the airborne platform (eg; helicopter or fixed wing) increase, the potential for mutual interference increases. Close spacing of dedicated antennas can result in the radiated power of one radio interfering with another radio whose antenna is in proximity to the other antenna that is transmitting. The nature of the interference may be caused by transmit power of a level such that the receiving radio/antenna's receiver bandwidth processes the RF energy at the edges of its receiver bandwidth. This is sometimes referred to as the skirts of the receiver. This undesired interference problem is further increased when the radios are wideband units that cover a broad portion of the RF spectrum. When wideband transmitters of any kind are utilized such as for communications, navigation, IFF, etc., the harmonic content of each transmitter may also interfere with any of the receiving devices located in proximity.

Aircraft may typically have from three to as many as fifty antennas on the fuselage. Each antenna is installed to achieve proper coverage and the correct ground plane. The ability to locate an antenna at any arbitrary location to avoid interference may not be possible due to lack of ground plane, interference with maintenance access, or ground clearance. Interference of one transmitter with another receiver is most often a compromise to balance coverage, pattern efficiency, and mutual interference. As the number of antennas increases, so does the difficulty in locating antennas. These types of considerations must be addressed for ground stations, fixed wing aircraft, and helicopters.

Accordingly, it is desirable to provide a communication system which provides desired spatial coverage while minimizing interference due to the practical limitations associated with the space available to locate a multiple of antennas.

SUMMARY OF THE INVENTION

A communication system according to an exemplary aspect of the present invention includes an antenna array having a respective antenna for each of a multitude of communication modules and a control system which selectively reassigns communication over a first of said multitude of communication modules to a second communication module of said multitude of communication modules in response to identification of a predicted self-induced interference within a predetermined interference matrix.

A method of managing a communication system according to an exemplary aspect of the present invention includes identifying a predicted self-induced interference within a predetermined interference matrix between a first communication module with a first antenna and a second communication module with a second antenna; and reassigning the first communication module with the first antenna to a third communication module with a third antenna in response to the predetermined interference matrix to avoid the predicted interference.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 3 is a simplified schematic representation of an interference matrix according to the present invention.

DETAILED DESCRIPTION OF THE PREFERRED EMBODIMENT

Figure 1:
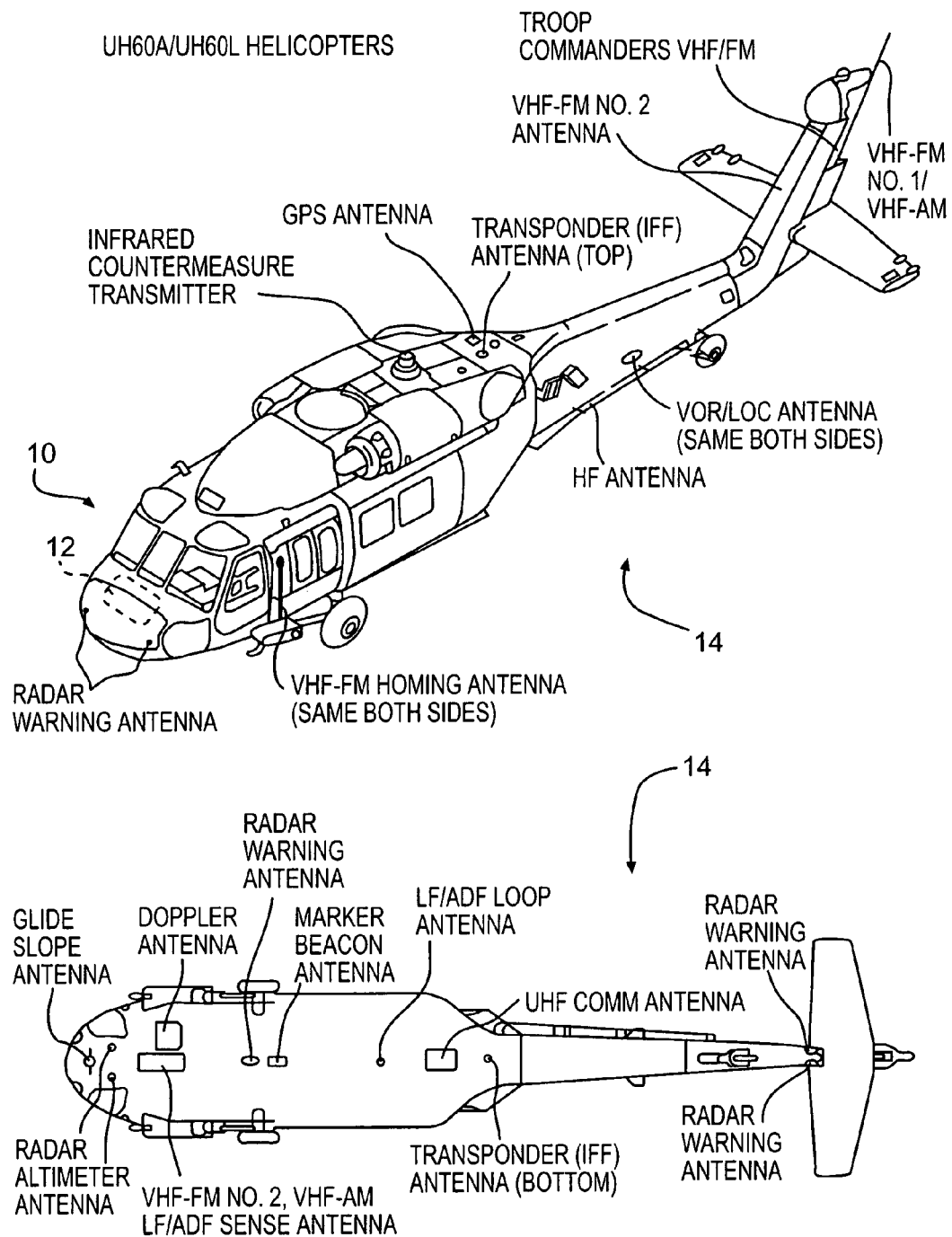
FIG. 1 is a general perspective view an exemplary rotary wing aircraft embodiment for use with the present invention.

FIG. 1 illustrates a general perspective view of an aircraft 10 having a communication system 12 with an antenna array 14. Although the present invention is described hereinbelow in terms of a particular aircraft configuration as illustrated in the disclosed embodiment, it should be understood that the present invention may be modified for use with other aircraft and ground systems and sites. It should be understood that the "communication system" as used herein includes other navigation, identification, alert systems and the like which have an antenna within the antenna array 14 (FIG. 1). Such other systems will also benefit from the present invention.

Figure 2:
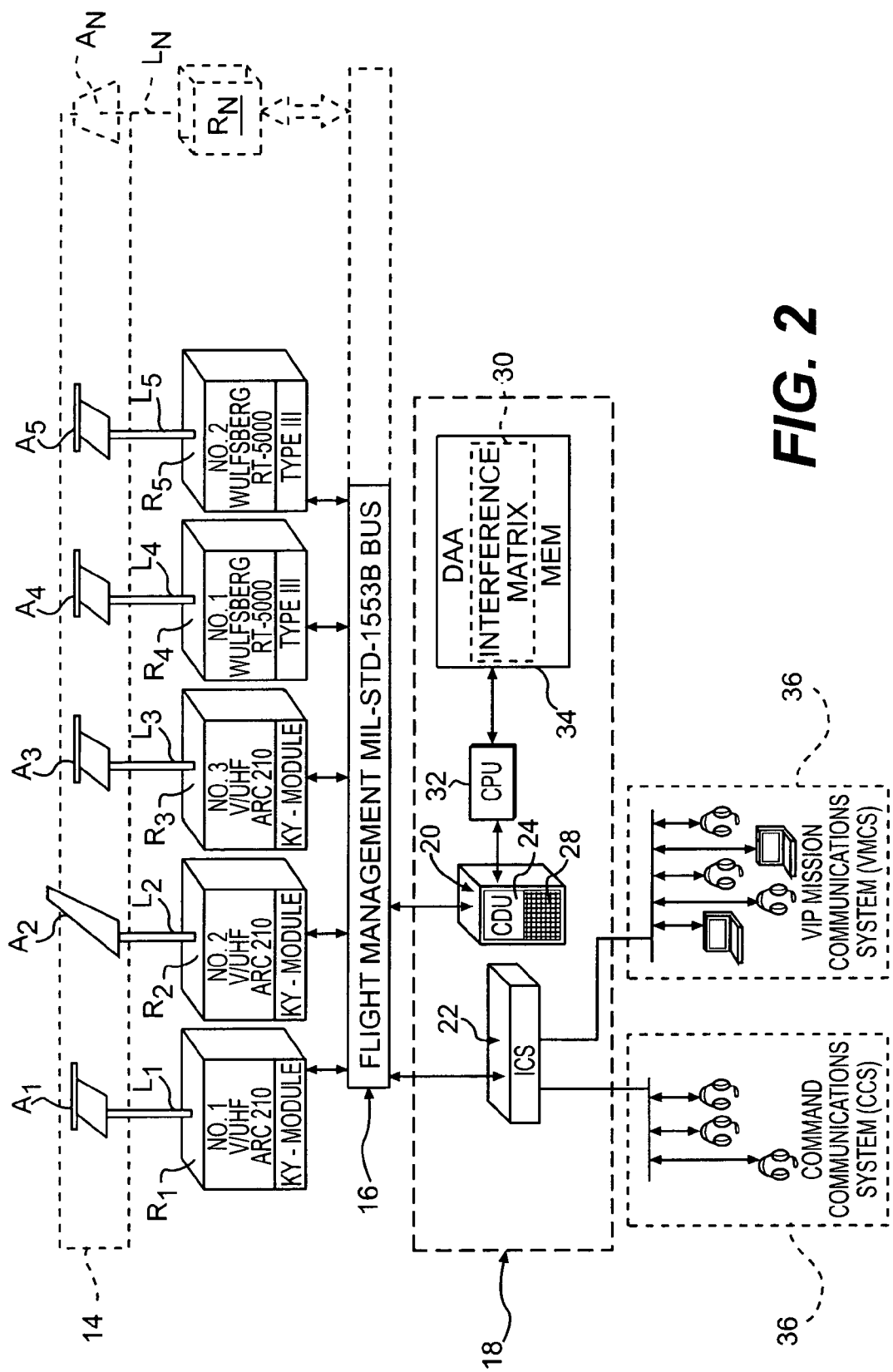
FIG. 2 is a block diagram of communication system of the present invention.

Referring to FIG. 2, the antenna array 14 includes a multiple of antennas A1-An each located in a particular location on the aircraft 10 (FIG. 1). Due to the fixed location, each antenna A1-An may also be subject to interference from, and subject other antennas, to interference. Each antenna A1-An provides dedicated transmission and/or reception for a respective communication modules R1-Rn over a transmission line L1-Ln. It should be understood that "communication module" as utilized herein includes single-use receiver-transmitters, multifunction broadband transceivers as well as other alert systems such as radar warning receivers, IFF systems and the like which require an antenna within the antenna array.

Typically, the aircraft 10 often includes duplicate communication modules, here for example, communication modules R1-R3 are of an equivalent type and communication modules R4-R5 are equivalent. It should be understood that various systems and combinations of systems may be used with the present invention, and the systems disclosed in the illustrated embodiment are for descriptive purposes only and are not limited to those alone.

Each of the duplicate communication modules R1-R3, R4-R5 although providing equivalent capabilities typically have their respective antennas A1-A3 and A4-A5 located in different fixed positions on the aircraft 10 (FIG. 1). Having the antennas A1-An located in different fixed positions results in different potential interference interactions between any pair of antennas A1-An.

Each communication module R1-Rn communicates with a data bus 16 which provides communication between each communication modules R1-Rn and a control system 18. The control system 18 includes a crew interface system 20 and a communication interface 22.

The crew interface system 20 includes a display 24 such as a high resolution LCD or flat panel display, which depicts antenna array allocation and communication module R1-Rn distribution information to the crew such that the crew may interact with the communication system 12. The crew interface system 20 further includes an input device 28, a plurality of buttons and directional keypad, but alternatively including a mouse, keyboard, keypad, remote device or microphone. Alternatively, the display 24 can be a touch screen display.

The crew interface system 20 further includes a CPU 32 and storage device 34 connected to the CPU 32. The storage device 34 may include a hard drive, CD ROM, DVD, RAM, ROM or other optically readable storage, magnetic storage or integrated circuit. The storage device 34 contains a database 36 (illustrated schematically) with a Dynamic Antenna Allocation (DAA) algorithm and an interference matrix 30 (also illustrated schematically in FIG. 3). Other operational software for the CPU 32 may also be stored in storage device 34 or alternatively in ROM, RAM or flash memory.

The communication interface 22 provides an input/output to crew audio systems 38 which may include a helmet mounted microphone and headphone speaker systems as well as other audio and voice systems. Multiple crewmembers are accommodated by the communication interface 22.

The DAA algorithm achieves equivalent flexibility, redundancy, and functionality to antenna sharing through software-controlled reconfiguration by the control system 18. The DAA manages the multiple of communication module R1-Rn and their dedicated antennas A1-An in response to the interference matrix 30 which has been preprogrammed with the potential interactions of all the communication modules R1-Rn. The Interference matrix is determined by a combination of analyses and testing for each particular aircraft 10 and is a look-up table stored as a portion of the database 36 (FIG. 3). The look up table is itself dynamic in that it must make decisions related to potential interference as a function of the frequency differential between radios, and the harmonic interaction potential. Both harmonic and "in-band" interference combinations are defined in the interference matrix via a priori analyses and measurements of the communication module R1-Rn and associated antenna array 14 for the particular aircraft 10 (FIG. 1). Additionally, interferences that may be determined after predefining the interference matrix are selectively added to the interference matrix upon acceptance by the crew through the crew interface system 20. That is, interference variability such as operating environments and equipment upgrades which have not been predefined and are identified by engineering design as a result of predictive analysis, or by the crew, and are later added to the interference matrix to account for these variabilities.

In operation, when a discrete radio frequency, combined with an antenna A1-An located at a fixed point, and further combined with the frequency of any other communications device is selected for use simultaneously, the DAA algorithm will "look-up" that particular combination in the interference matrix to determine if the desired combination may result in an interference. When the desired combination of the discrete radio frequency, combined with an antenna A1-An located at a fixed point, and further combined with the frequency of any other communications device is predicted to result in an interference therebetween, the communication system 12 will alert the crew through the crew interface system 20. The crew may then reassign the interacting pair of communication modules R1-Rn to another pair of communication module R1-Rn that utilize other dedicated antennas A1-An such that then antenna A1-An provides improved electronic isolation. The newly defined allocation then is checked to see if a subsequent interference potential may be generated as a result of the intended reallocation. Using this sequential technique, unintended secondary interferences are avoided prior to the automatic or manual reassignment. This process can repeat until all the interference conditions are resolved. Such reassignment may also occur automatically in response to the interference matrix 30.

In one non-limiting operational example, if particular conditions cause transmissions at frequency F from antenna A1 to interfere with reception on antenna A2, the DAA will reassign transmission on frequency F from transceiver R1 to, for example, module R4 which has dedicated antenna A4. The interference matrix, through predetermined analyses and/or testing, having determined that antenna A2 will not be interfered with by transmission on Frequency F from antenna A4 thereby provides virtual switching between module R1/antenna A1 and module R4/antenna A4 over the data bus 16. Such virtual switching of hardware may be performed automatically in a manner transparent to the crew and the results displayed to the crew on the crew interface system 20. Alternatively, or additionally, the crew interface system 20 displays a multiple of alternative selections which may be manually selected. It should be understood that the interference matrix 30 illustrated in FIG. 3 is vastly simplified and that significant quantities of information are stored within the interference matrix 30 to define the interaction between each module/antenna with every other module/antenna at expected frequencies when utilized for transmitting and receiving from particular directions, operational environments and instructions for which module/antenna is the preferred re-assignment.

As much of the RF energy generated as possible must be efficiently transferred to the antennas to secure the maximum radiated power from a transmitter. Also, for best reception, maximum transfer of energy from the antenna to the receiver must occur. Efficient transmission and reception conditions prevail whenever the transmitter (or receiver) is properly matched to the transmission line and the transmission line is properly matched to the antenna. That is, this system solution maintains a dedicated antenna A1-An for each communication module R1-Rn and intended function, maximizing isolation between the modules and emphasizing flexible reassignment rather than additional antenna complexity and/or selective antenna RF transmission line switching.

Through transceiver/antenna selection and frequency management, DAA enhances redundancy, increases performance, and mitigates cosite interference. DAA also improves reliability and reduces weight by eliminating hardware heretofore required for RF transmission line switching. Furthermore, DAA reduces pilot workload by automating the process of antenna allocation, which requires operator intervention in conventional designs It should be understood that relative positional terms such as "forward," "aft," "upper," "lower," "above," "below," and the like are with reference to the normal operational attitude of the vehicle and should not be considered otherwise limiting.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A communication system comprising:
   a multitude of communication modules;
   an antenna array having a respective antenna for each of said multitude of communication modules; and
   a control system which selectively reassigns communication over a first of said multitude of communication modules to a second communication module of said multitude of communication modules in response to identification of a predicted self-induced interference within a predetermined interference matrix.

2. The communication system as recited in claim 1, wherein said control system includes a crew interface system having a storage device which stores a Dynamic Antenna Allocation (DAA) algorithm of said predetermined interference matrix.

3. The communication system as recited in claim 1, wherein said predetermined interference matrix includes a multiple of predicted interferences of said multitude of communication modules and respective antennas.

4. The communication system as recited in claim 1, wherein said predetermined interference matrix includes harmonic and "in-band" interference combinations of each of said multitude of communication modules and respective antennas.

5. The communication system as recited in claim 1, wherein said control system reassigns communication over a discrete frequency from said first of said multitude of communication modules to said second communication module in response to a predicted interference within said predetermined interference matrix between said first antenna of said first of said multitude of communication modules and a third antenna of a third communication module of said multitude of communication modules.

6. The communication system as recited in claim 5, wherein said third communication module is currently in use during said reassignment.

7. The communication system as recited in claim 5, wherein said second communication module is of the identical type of said first communication module.

8. The communication system as recited in claim 1, wherein said multitude of communication modules includes a single-use receiver.

9. The communication system as recited in claim 1, wherein said multitude of communication modules includes a multifunction broadband transceiver.

10. The communication system as recited in claim 1, wherein said multitude of communication modules includes a single use transmitter.

11. The communication system as recited in claim 1, wherein said multitude of communication modules includes a radar warning receiver.

12. The communication system as recited in claim 1, wherein said multitude of communication modules includes a satellite navigation receiver.

13. The communication system as recited in claim 1, wherein said multitude of communication modules includes an Identification Friend or Foe (IFF) system.

14. The communication system as recited in claim 1, wherein said control system includes a crew interface system, said crew interface operable to issue an alert in response to said predicted interference interaction.

15. The communication system as recited in claim 14, wherein said crew interface system is operable to select a third communication module of said multiple of communication modules and override said reassignment to said second communication module of said multitude of communication modules in response to said predetermined interference matrix.

16. The communication system as recited in claim 15, wherein said third communication module is manually selectable from a subset of said multiple of communication modules which avoid the predicted interference.

17. The communication system as recited in claim 1, wherein said antenna array is mounted to a vehicle such that a location of each of said respective antennas at least in part define said predetermined interference matrix.

18. A method of managing a communication system comprising:
   identifying a predicted self-induced interference within a predetermined interference matrix between a first communication module with a first antenna and a second communication module with a second antenna; and
   reassigning the first communication module with the first antenna to a third communication module with a third antenna in response to the predetermined interference matrix to avoid the predicted interference.

19. A method as recited in claim 18, further comprising:
   looking up the predicted interference in the predetermined interference matrix.

20. A method as recited in claim 18, further comprising:
   identifying the predicted interference between the first communication module with the first antenna and the second communication module with the second antenna at a particular frequency.

21. A method as recited in claim 20, further comprising:
   reassigning the particular frequency to the third communication module with the third antenna.

22. A method as recited in claim 18, wherein the third communication module is of the identical type of said first communication module.

23. A method as recited in claim 18, further comprising:

displaying a multiple of communication modules as alternatives to the third communication module for selection by an operator.

24. A method as recited in claim 18, further comprising:

looking up a relationship between the first communication module with the first antenna and the second communication module with the second antenna in the predetermined interference matrix to determine the predicted interference.

25. A method as recited in claim 18, further comprising:

looking up a relationship between the second communication module with the second antenna and the third communication module with the third antenna in the predetermined interference matrix; and identifying whether the relationship between the second communication module with the second antenna and the third communication module with the third antenna defines a second predicted interference.

26. A method as recited in claim 25, further comprising:

identifying the second predicted interference within the predetermined interference matrix; and reassigning the first communication module with the first antenna to a fourth communication module with a fourth antenna in response to the predetermined interference matrix to avoid the second predicted interference.

27. A method as recited in claim 25, further comprising:

repeating the look-up until no predicted interferences are identified.

28. An aircraft comprising:

a multitude of communication modules;

an antenna array having a respective antenna for each of said multitude of communication modules, said antenna array is mounted to the aircraft such that a relative location of each of said respective antennas at least in part define a predetermined interference matrix; and a control system which selectively reassigns communication over a first of said multitude of communication modules to a second communication module of said multitude of communication modules in response to identification of a predicted self-induced interference within said predetermined interference matrix.

29. The aircraft as recited in claim 28, wherein said aircraft is a rotary-wing aircraft.

30. The aircraft as recited in claim 28, wherein said multitude of communication modules includes a single-use receiver.

31. The aircraft as recited in claim 28, wherein said multitude of communication modules includes a multifunction broadband transceiver.

32. The aircraft as recited in claim 28, wherein said multitude of communication modules includes a single sue transmitter.

* * * * *

UNITED STATES PATENT AND TRADEMARK OFFICE
CERTIFICATE OF CORRECTION

PATENT NO. : 7,395,084 B2 Page 1 of 1
APPLICATION NO. : 11/041448
DATED : July 1, 2008
INVENTOR(S) : Anttila It is certified that error appears in the above-identified patent and that said Letters Patent is hereby corrected as shown below:

Column 8, line 27: "sue" should read as --use--

Signed and Sealed this

Thirtieth Day of September, 2008

JON W. DUDAS
*Director of the United States Patent and Trademark Office*